Feb. 2, 1954  H. E. WINKLER ET AL  2,667,768
TORQUE TRANSMITTING COUPLING
Filed Nov. 27, 1951
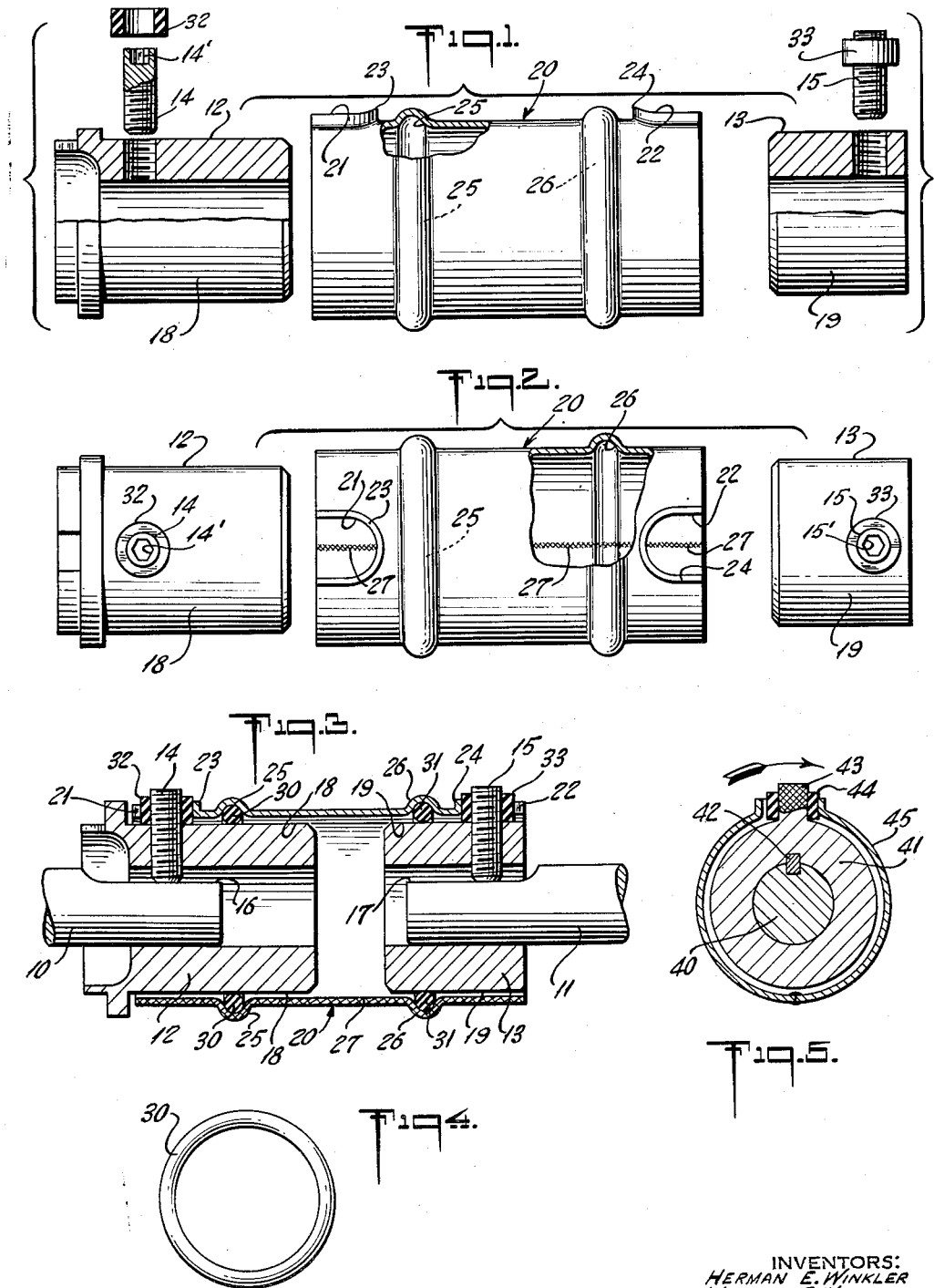
INVENTORS:
HERMAN E. WINKLER
MAURICE F. WINKLER
BY
ATTORNEY:

Patented Feb. 2, 1954

2,667,768

UNITED STATES PATENT OFFICE 2,667,768

TORQUE TRANSMITTING COUPLING

Herman E. Winkler and Maurice F. Winkler, Lebanon, Ind., assignors, by mesne assignments, to Stewart-Warner Corporation, Chicago, Ill., a corporation of Virginia Application November 27, 1951, Serial No. 258,387

11 Claims. (Cl. 64—11)

1

The present invention relates to torque transmitting couplings for transmitting rotary motion. The present invention contemplates couplings for transmitting rotary motion which are suitable for use between driving and driven shafts in substantial alignment, and wherein constant torque transmission and limited flexibility are required of the coupling.

According to the present invention, a coupling construction is provided which will permit a driving and driven shaft to be connected for transmission of rotary motion by means of a pair of hub members which are secured to their respective shafts and on which floats a coupling member drivingly connected thereto through resilient, non-metallic elements so as to effect continuous driving action between the shafts, without any metal-to-metal contact, or the storing of energy permitting surging.

The present invention contemplates the provision of each of the axially spaced, rotatable members (driving and driven) with projections extending outwardly, and drivingly connecting these projections to one another through resilient, rubber-like cushions carried about them and engaging a sleeve into which both cushions enter, and the sleeve is kept out of contact with the driving and driven members by resilient rings or bands. The projections may be integral with the rotatable members or one may use projecting pins or screws.

The present coupling construction is particularly adapted for connecting an oil pump motor drive shaft to the driven shaft of a fuel pump on a pressure-type oil burner, although it will be understood that the present invention is not limited to such use, and is contemplated for use wherever torque is to be transmitted between a driving and a driven member.

Other and further objects will appear as the description proceeds.

The accompanying drawings show, for purposes of illustrating the present invention, two embodiments in which the invention may take form, it being understood that the drawings are illustrative of the invention rather than limiting the same.

In the drawings:

Figure 1 is a partially exploded side elevational view showing the hub members axially removed from the tubular sleeve coupling member and showing the outwardly extending projections as screws radially removed from the hub members;

Figure 2 is a partially exploded top plan view of the same;

2

Figure 3 is a longitudinal sectional view showing the parts assembled in operative engagement with driving and driven shafts;

Figure 4 is an elevational view showing one of the resilient, non-metallic rings positioned between the tubular sleeve coupling member and the hub members; and Figure 5 is a transverse section illustrating a modified form of construction.

In Figure 3, the shafts 10 and 11 are substantially in axial alignment, spaced from one another a convenient distance, and one, for example the left shaft 10, is connected to a driver such as a motor, while the other 11, is connected to a load. These shafts may float along the axis to a limited extent or not, depending upon the particular machine in which they are used.

The shaft 10 is shown as carrying a hub 12 and the shaft 11 as carrying a hub 13. While both hubs are shown as being secured to the respective shafts by jam screws 14 and 15 engaging flats 16 and 17 on the shafts, it is, of course, obvious that they may be secured by splines, keys, tapered pins or in any other manner common in the art. In most cases the screws are most convenient. They may be long enough to project beyond the outer cylindrical surfaces 18 and 19 of the hubs and preferably are provided with sockets 14' and 15' for an Allen wrench.

Screws carried by hubs have heretofore been used for the purpose of engaging with the ends of a helical spring to provide a flexible coupling, but such spring tends to wind and unwind giving uneven transmission of power, and to produce excessive noise.

A sleeve 20 somewhat larger in diameter than the outside of the hubs 12 and 13 and of suitable length is provided with openings 21 and 22 somewhat wider circumferentially than the size of the screws 14 and 15. The sleeve 20 is preferably made from a flat sheet metal blank. The openings 21 and 22 are formed by striking out the metal to form flanges 23, 24 and it is provided with grooves 25 and 26 before it is rolled to form a sleeve and welded as indicated by the weld marks 27. The grooves just referred to then form annular ridges on the outside of the sleeve and inwardly facing annular grooves. The sleeve receives two soft rubber-like O-rings 30, 31 which fit into the annular grooves mentioned and extend somewhat inside the inner surface of the sleeve.

The outer ends of the screws 14, 15 receive soft rubber-like rings 32, 33 which tightly grip the threads on the screws and are preferably slightly smaller in diameter than the width of the slots or openings 21, 22. The hubs, jam screws and rubber spacers about the jam screws may be assembled ready for use. The sleeve, together with the soft rubber-like O-ring spacers may be assembled for use. The entire coupling may be shipper as such with the hubs in place, and may be disassembled so as to facilitate assembling it together with the shaft equipped mechanism.

In use, the torque applied to one hub, for example hub 12, is transmitted through the projecting screw 14 and the cushion spacer 32 to the flange 23 about the opening 21. The torque is then transmitted through the sleeve 29, the opposite flange on the other opening 22, the spacer 33 and screw 15 to the hub and driven shaft 13. During this operation, the spacers 32 and 33 act to cushion the drive irrespective of the change of direction torque is being transmitted and to keep the metal parts out of contact. The O-rings also keep the sleeve out of contact with either of the hubs and permit the shafts to revolve freely about their own respective axes. This drive takes place without noise or chatter.

In the modified form of construction of Figure 5, the shaft 40 is secured to the hub 41 by a key 42. The hub 41 carries a boss or projection 43 which functions the same as the projecting screws 14 or 15. These receive rubber ring spacers 44 like the spacers previously described and drive the sleeve 45 in the manner above set forth.

While the sleeve is shown as being made of sheet metal with a welded joint, it is of course possible to make the sleeve out of sufficiently heavy tubular stock to permit making the grooves for the O-rings and provide the wide faces for engagement with the driving spacers. The devices shown herein may be readily assembled and disassembled for maintenance and repair of the driving or driven mechanism.

Since it is obvious that the invention may be embodied in other forms and constructions within the scope of the claims, we wish it to be understood that the particular forms shown are but two of these forms, and various modifications and changes being possible, we do not otherwise limit ourselves in any way with respect thereto.

What is claimed:

1. A torque transmitting coupling for use with two aligned shafts, comprising two shaft attachable hub members, each having a radial, outwardly projecting element, a concentric, open ended, metallic sleeve about the hub members and having oversize openings which receive the radially projecting elements, resilient, non-metallic spacers between the hub members and the sleeve and acting to keep them out of contact, and resilient, non-metallic spacers about the projecting elements and in the oversize openings in the sleeve to transmit the torque and keep the projecting elements out of contact with the sleeve.

2. A torque transmitting coupling such as claimed in claim 1, wherein the spacers between the hub members and sleeves are soft rubber-like O-rings of circular cross-section and the sleeve has annular grooves to position the O-rings lengthwise.

3. A torque transmitting coupling such as claimed in claim 1, wherein the sleeve openings extend to the ends of the sleeve to permit longitudinal insertion of a hub member with its projecting element and associated spacer into the end of the sleeve or their endwise removal.

4. A torque transmitting coupling such as claimed in claim 1, wherein the projecting elements are the projecting ends of shaft clamping screws threaded through the respective hub members.

5. A torque transmitting coupling such as claimed in claim 1, wherein the sleeve is a sheet metal sleeve and has a longitudinally extending welded seam.

6. A torque transmitting coupling such as claimed in claim 1, wherein the sleeve is formed of sheet metal and the openings have side flanges to provide widened bearing surfaces for the spacers in contact therewith.

7. The combination with two aligned rotatable shafts fixedly carried in spaced relation, each carrying an externally cylindrical hub out of contact with the other hub and provided with outwardly projecting metallic elements spaced from the adjacent ends of the hubs, of a metallic sleeve loosely received about the hubs and having a slot at each end into which the projecting elements extend, a non-metallic cushioning ring about each hub and against which the sleeve bears, and non-metallic cushions between the projecting elements on the hub and the side walls of the slots for transmitting torque and keeping the same out of contact with one another.

8. A coupling for transmitting rotary motion between driving and driven elements longitudinally spaced apart and in substantial alignment, comprising a tubular sleeve member, open at each end and having pin receiving openings, a tubular hub member positioned in each end of said sleeve member and adapted to receive said respective driving and driven elements therein so that the sleeve extends across the gap spacing the same, radially extending pins each secured to a hub member and having an outer end entering a pin receiving opening and an inner end operatively engaged with a hub member and adapted to operatively engage the corresponding driving and driven element, and resilient, non-metallic bushings surrounding the portions of said pins in said openings.

9. A coupling for transmitting rotary motion between driving and driven elements longitudinally spaced apart and in substantial alignment, comprising a tubular sleeve member, open at each end and having pin receiving openings, a hub member positioned in each end of said sleeve member and adapted to receive said respective driving and driven elements therein so that the sleeve extends across the gap spacing the same, radially extending pins each entering a pin receiving opening and operatively engaged with a hub member, resilient, non-metallic bushings surrounding the portions of said pins in said openings, and resilient, non-metallic rings positioned between adjacent surfaces of said sleeve member and said hub members.

10. A coupling such as claimed in claim 9, wherein the sleeve member has annular, inwardly opening grooves, and the rings are in the grooves.

11. A coupling for transmitting rotary motion between driving and driven elements longitudinally spaced apart and in substantial alignment, comprising a tubular sleeve member, open at each end and having open-ended slots forming pin receiving openings, a hub member positioned in each end of said sleeve member and adapted to receive said respective driving and driven elements therein so that the sleeve extends across the gap spacing the same, radially extending pins each entering a pin receiving opening and operatively engaged with a hub member, and resilient, non-metallic bushings surrounding the portions of said pins in said openings.

HERMAN E. WINKLER.
MAURICE F. WINKLER.

References Cited in the file of this patent

UNITED STATES PATENTS

| Number | Name | Date |
|---|---|---|
| 1,471,143 | Cromwell | Oct. 16, 1923 |
| 1,945,293 | Pierce | Jan. 30, 1934 |
| 2,251,804 | Reuter et al. | Aug. 5, 1941 |
| 2,272,900 | Saurer | Feb. 10, 1942 |
| 2,486,885 | Santon | Nov. 1, 1949 |
| 2,550,517 | Bales | Apr. 24, 1951 |
| 2,554,311 | Place | May 22, 1951 |